(No Model.)

J. W. BAKER.
MANGER.

No. 316,435.  Patented Apr. 28, 1885.

Witnesses:
A. M. Baker
J. H. Taylor

Inventor.
James W. Baker

UNITED STATES PATENT OFFICE.

JAMES W. BAKER, OF PROVIDENCE, RHODE ISLAND.

MANGER.

SPECIFICATION forming part of Letters Patent No. 316,435, dated April 28, 1885.

Application filed August 1, 1884. (No model.)

*To all whom it may concern:*

Be it known that I, JAMES W. BAKER, a citizen of the United States, residing in the city and county of Providence, and State of Rhode Island, have invented a new and useful Manger, of which the following is a specification.

My invention relates to improvements in mangers for holding grain and hay feed for animals; and the objects of my improvements are, first, to provide a trough for the manger that will keep in position for use, and that will admit of being turned bottom side up or taken from the stall to be cleansed; second, to so construct the rack of the manger that it will keep the hay in position to be fed to the animal, and which will not interfere with the free movement of the animal's head, and which will admit of being easily moved aside for free access to the trough of the manger. I attain these objects by the mechanism and construction illustrated in the accompanying drawings, in which—

Figure 1:
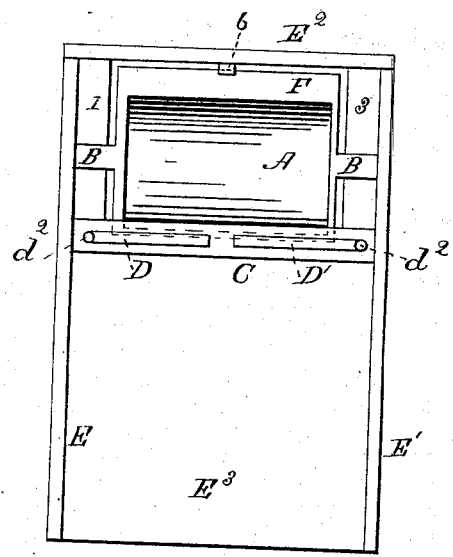
Figure 2:
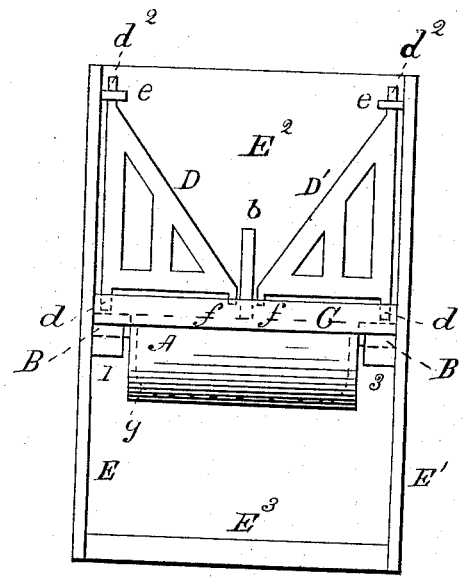
Figure 3:
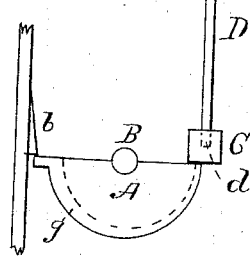
Figure 4:
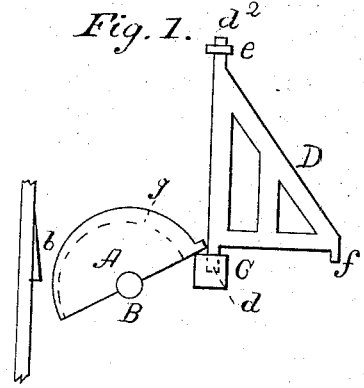

Figure 1 is a top view, and Fig. 2 an end view, of the stall in which the manger is shown in position to receive feed. Figs. 3 and 4 are detailed end views of the trough and rack of the manger as they appear, respectively, when held in position for use and turned bottom side up and aside for cleansing.

Similar letters refer to similar parts throughout the several views.

E E' E² E³ represent the sides, end, and bottom of a stall, inside of which is secured the frame C 1 3. The back and sides of the manger are composed of a part of the sides and end E E' E². The trough A of the manger is constructed of any material and in any form convenient that will admit of being turned bottom side up. In the present instance I prefer it made of cast-iron with a rounding bottom, flat ends, and with all inside corners curved, as shown in the drawings by broken lines $g$ $g'$, so as to be free from angles where the feed would be liable to permanently lodge. The trough A is supported by its trunnions B B' in bearings constructed in the side frames, 1 3. The back edge, F, of the trough A is constructed in the form of a flange, which acts as a hand-piece to grasp when turning the trough over. The back side of the trough A is made heavier than the front, as shown by the broken line $g'$, Figs. 3, 4, thus being out of balance as it swings freely on the trunnions B B', the heavy side will keep the trough right side up with its front edge bearing against the under side of the front frame, C.

This suspending of the trough A on trunnions with one side constructed heavier than the other, I consider to be an advantage over troughs of mangers as heretofore constructed, which are stationary, and from which all refuse must be lifted, and when cleansed water must be put into and taken from with the same inconvenience, whereas my improved manger admits of the turning bottom side up of the trough to empty from it all refuse, and when a more thorough cleansing is desired, as it is often, to promote the health of the animals, especially in summer when feed is liable to ferment, it is easily washed in the stall and the wash-water emptied by simply turning it over, which, when released, will swing back to its feeding position, and if it is desired to take the trough from the stall to the water-supply it is easily done by turning it up and lifting it from the supporting-frame 1 3, as no coverings are necessary for the bearings of the trunnions B B' to interfere with its being lifted. The spring-catch $b$, as shown in Fig. 3, can also be used to hold the trough A in position, if desired, though I do not consider it always necessary.

The rack of the manger, which prevents the hay from coming toward the animal, consists of two triangular gates, D D', which are supported and hung so as to swing on the pintles $d$ $d^2$, the pintles $d$ having bearings in the front frame, C, and the pintles $d^2$ being held by staples $e$, which are secured to the sides E E' of the stall. The short pintles $f$ act as bolts, which drop into cavities in the frame C, to hold the rack in feeding position. When it is desired to turn one or both parts of the rack aside so as to get at the trough A, the bolts $f$ $f$ are lifted from the cavities in the frame, thus allowing said rack to be turned.

This construction of the rack of the manger for holding the hay I consider an improvement over contrivances as heretofore made for the same purpose, such as partitions with oblong holes in them through which the animal puts its head to get at the feed, and which prevents the proper amount of freedom upward and sidewise of its head, when at times it is throwing about hay in the manger in search of grain, which actions sometimes bring the head injuriously against the sides or top of the rack. Now, my improved rack not only admits of being turned aside to give access to the trough, but is of such form as to prevent the hay from being thrown from the manger, (as the animal in throwing the hay invariably throws it down and sidewise, though the head goes up in the act,) and there being no part of it over the animal's head, but, having its top sides slanting, the greatest practicable freedom is given the head consistent with keeping the hay in its proper place.

Having described my improvement in mangers, what I claim, and desire to secure by Letters Patent of the United States, is—

1. The combination, in a manger, of the trough A, which admits of being turned over, with a rack composed of two triangular gates, D D', substantially as set forth.

2. The combination, in a manger, of a rack consisting of two triangular gates, D D', provided with pintles $d\ d^2$ and bolts $f$, with the sides E E', and frame C of the manger provided with bearings for the pintles $d\ d^2$ and cavities for the bolts $f$, substantially as described.

JAMES W. BAKER.

Witnesses:
CHARLES A. BRIGHAM,
JOHN H. CROWELL.